(12) United States Patent
Kabuto

(10) Patent No.: US 8,732,785 B2
(45) Date of Patent: May 20, 2014

(54) TRANSMISSION SYSTEM AND RELAY DEVICE

(75) Inventor: Nobuaki Kabuto, Kunitachi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 65 days.

(21) Appl. No.: 13/316,757

(22) Filed: Dec. 12, 2011

(65) Prior Publication Data

US 2012/0229706 A1 Sep. 13, 2012

(30) Foreign Application Priority Data

Mar. 9, 2011 (JP) ................................. 2011-050971

(51) Int. Cl.
*H04N 7/16* (2011.01)

(52) U.S. Cl.
USPC ............................ 725/141; 725/153; 348/723

(58) Field of Classification Search
USPC .................... 725/141, 153; 348/723
See application file for complete search history.

(56) References Cited

U.S. PATENT DOCUMENTS

| 7,609,255 | B2 * | 10/2009 | Frederick et al. ............. 345/211 |
| 2008/0315291 | A1 | 12/2008 | Kito et al. |
| 2009/0244391 | A1 * | 10/2009 | Kitami et al. .................. 348/705 |
| 2009/0264069 | A1 * | 10/2009 | Yamasuge ..................... 455/41.1 |
| 2010/0135429 | A1 * | 6/2010 | Nakajima ...................... 375/295 |
| 2011/0072103 | A1 * | 3/2011 | Goto ............................. 709/208 |

FOREIGN PATENT DOCUMENTS

| JP | 2009-4510 | 1/2009 |
| JP | 2009-44706 | 2/2009 |

* cited by examiner

*Primary Examiner* — Nnenna Ekpo
(74) *Attorney, Agent, or Firm* — Antonelli, Terry, Stout & Krauss, LLP.

(57) ABSTRACT

Provided is a system for supplying a power from a sink device to a source device. Not only the source device but also a cable or a repeater device to be connected thereto has compatibility in power supply. A physical address obtained from information of an EDID memory forms a base of CEC message exchange, but a physical address of the cable or repeater device is overlapped with the source device or unknown. The cable or a repeater device uses changes the type of a message while using the same physical address as the source device or use such a message having the physical address information of the source device is described in a parameter of the message using the unknown physical address. The message having a supply or reception current for each device described therein is exchanged with the sink device or the source device to adjust current reception.

4 Claims, 16 Drawing Sheets

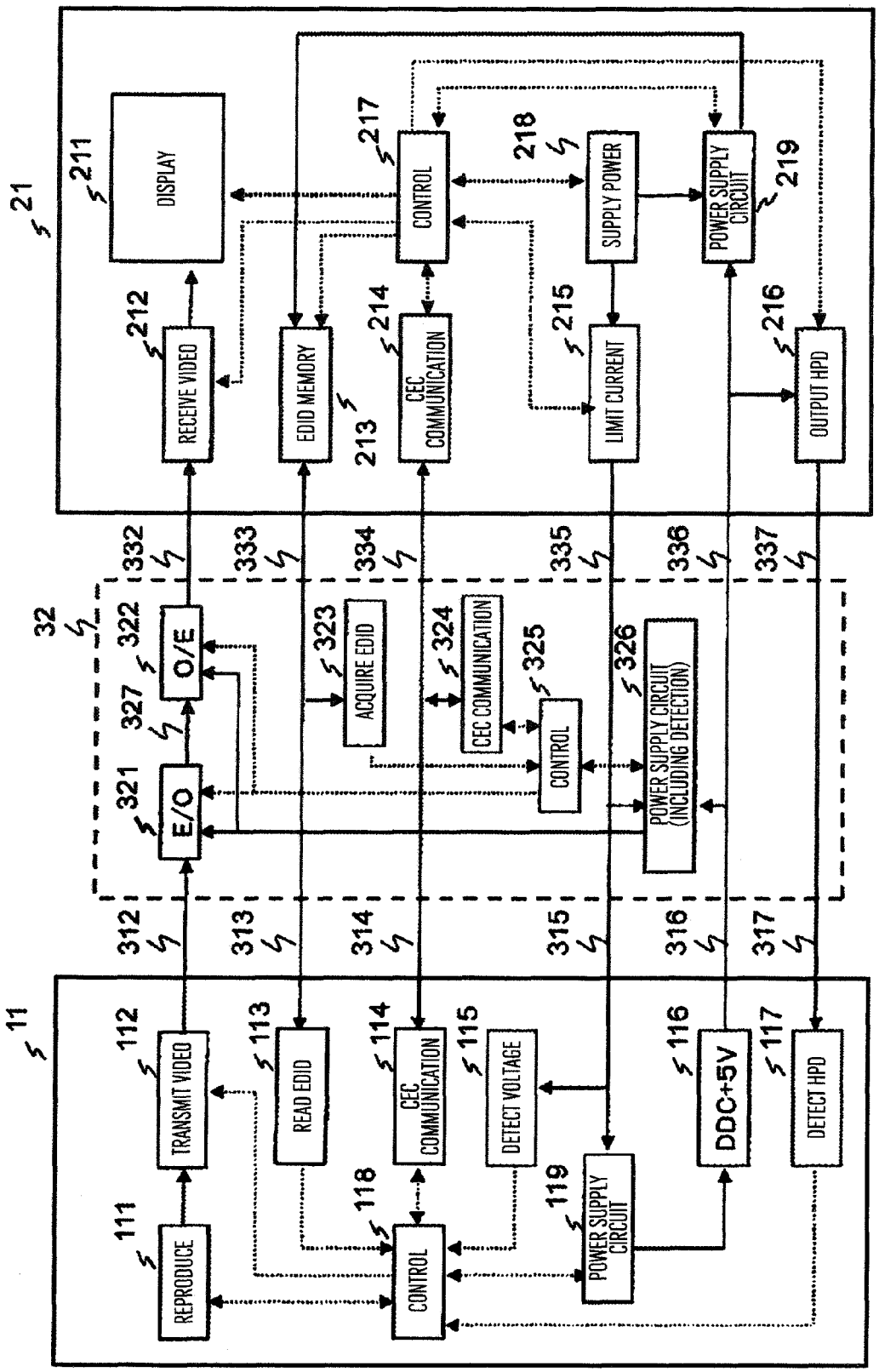

FIG.2

| Start Bit | CEC Header Block | CEC Opcode Block | Initiator Physical Address | CDC Opcode | CDC Parameter |
|---|---|---|---|---|---|

FIG.3

| CDC Opcode | Parameters | Parameter description | Response |
|---|---|---|---|
| <CDC_Power_Request> | [Power_Source] | Requesting current. | <CDC_Power_Status><CDC_Power_Request_C> |
| <CDC_Power_Status> | [Power_Sink] | Supplying current. | - |
| <CDC_Power_Notice> | [Power_Sink] | Will change to this current. | <CDC_Power_Request><CDC_Power_Request_C> |
| <CDC_Power_Request_C> | [Power_Cable] | Requesting current and supplying current. | <CDC_Power_Status> |
| <CDC_Power_Notice_C> | [Power_Cable] | Will change to this current for a Source. | <CDC_Power_Request> |

FIG.4

| Name | Range Description | | Length | Purpose |
|---|---|---|---|---|
| [Power_Source] | "No need" | 0 | 1 bit | A Source does not need power from a Sink. |
| | "Need" | 1 | | A Source requires power from a Sink or a Cable. |
| | Reserved | | 7 bits | Set to "0000000". |
| [Power_Sink] | [Input Port Number] [P_Source] [P_Cable] | | 1 byte | |
| [Input Port Numver] | Sink's Input Port Number | | 4 bits | Specify a Sink's input port number. Same as the last number except 0 in the connected Source Physical Address. |
| [P_Source] | "No Power" | 0 | 2 bits | A Source is allowed to consume no power form a Sink nor a Cable. |
| | "Half Power" | 1 | | A Sink supply half power to each a Source and a Cable. |
| | "Power_S" | 2 | | A Source is allowed to consume power from a Sink.... |
| | "Power_C" | 3 | | A Source is allowed to consume power from a Cable (not a Sink).. |
| [P_Cable] | "No Power" | 0 | 2 bits | A Cable is allowed to consume no power. |
| | "Half Power" | 1 | | A Sink supply half power to each a Source and a Cable. |
| | "Full Power" | 2 | | A Cable is allowed to consume power from a Sink.. |
| | Reserved | 3 | | |
| [Power_Cable] | [Wire] [P_Source] [P_Cable] | | 1 byte | |
| [Wire] | "Connect" | 0 | 1 bit | Utility line is connected between the connecters. |
| | "No Connect" | 1 | | Utility line is not connected between the connecters. |
| [P_Source] | | | 2 bits | |
| [P_Cable] | | | 2 bits | |
| Reserved | | | 3 bits | Set to "000". |

FIG.8

| Name | Range Description | | Length | Purpose |
|---|---|---|---|---|
| [Power_Source] | [Sink_Current] [Source_Current] [Check_sum] | | 2 byte | |
| [Sink_Current] | "0mA" | 0 | 3 bits | Maximum current that Sink provides. |
| | "25mA" | 1 | | |
| | "150mA" | 2 | | |
| | "275mA" | 3 | | |
| | "400mA" | 4 | | |
| | "525mA" | 5 | | |
| | Reserved | 6-7 | | |
| [Source_Current] | "0mA" | 0 | 3 bits | Maximum current that Source is allowable to consume. Note: "5mA" is standby mode. At this case, a Source is allowed to consume 5mA except providing DDC+5V and to connect Utility line and DDC+5V line to read Sink's EDID. At other setting, such as larger than 5mA, a Source shall take care to provide 55 mA even if the power on Utility line is provided to DDC+5V line. |
| | "5mA" | 1 | | |
| | "125mA" | 2 | | |
| | "250mA" | 3 | | |
| | "375mA" | 4 | | |
| | "500mA" | 5 | | |
| | Reserved | 6-7 | | |
| [Check_sum] | Check sum | | 2 bits | Sum this message including header, opcode and parameters except starting bit. |

FIG.9

| Name | Range Description | Length | Purpose | | |
|---|---|---|---|---|---|
| [Power_Sink] | [Input Port Number] [Sink_Current] [Source_Current] [Cable_Current] [Check_sum] | 2 bytes | | | |
| [Input Port Numver] | Sink's Input Port Number | 4 bits | Specify a Sink's input port number. Same as the last number except 0 in the connected Source Physical Address. | | |
| Reserved | | 1 bit | Set to "0". | | |
| [Sink_Current] | | 3 bits | Maximum current that a Sink provides. | | |
| [Source_Current] | | 3 bits | Maximum current that a Source is allowable to consume. | | |
| [Cable_Current] | | 3 bits | Maximum current that Source is allowable to consume. Note: When "5mA" is setting as a standby mode, a Cable is allowed to consume under 5mA for a cable itself and connect Utility line and DDC+5V line which connects a Sink under the following cases, 1) No power from a Sink is provided to a Source. 2) A Source is also standby mode "5ma" and a Cable consume no power from a DDC+5V line from source. At other setting, such as larger than 5mA, a Cable shall take care to provide 55 mA even if the power on Utility line is provided to DDC+5V line. | | |
| | "0mA" | | | 0 | |
| | "5mA" | | | 1 | |
| | "125mA" | | | 2 | |
| | "250mA" | | | 3 | |
| | "375mA" | | | 4 | |
| | "500mA" | | | 5 | |
| | Reserved | | | 6-7 | |
| [Check_sum] | | 2 bits | | | |

FIG.10

| Name | Range Description | | Length | Purpose |
|---|---|---|---|---|
| [Power_Cable] | [Wire] [Power2] [Sink_Current] [Source_Current] [Cable_Current] [Check_sum] | | 2 bytes | |
| | [Wire] | "Connect" | 0 | 1 bit | Utility line is connected between the connectors. |
| | | "No Connect" | 1 | | Utility line is not connected between the connectors. |
| | [Power2] | "None" | 0 | 1 bit | A Source is allowed to consume no additional power except a Sink. |
| | | "Independent" | 1 | | A Source is allowed to consume additional power other than a Sink. |
| [Sink_Current] | | | 3 bits | Maximum current that a Sink provides. |
| [Source_Current] | | | 3 bits | Maximum current that a Source is allowable to consume. |
| [Cable_Current] | | | 3 bits | Maximum current that a Cable is allowable to consume. |
| Reserved | | | 3 bits | Set to "000". |
| [Check_sum] | | | 2 bits | |

FIG.14

| Byte # \ Bit | 7 | 6 | 5 | 4 | 3 | 2 | 1 | 0 |
|---|---|---|---|---|---|---|---|---|
| 0 | Vender-specific tag code (=3) | | | Length (=9) | | | | |
| 1-3 | 24-bit IEEE Registration Identifier (0x00C03) | | | | | | | |
| 4 | A | | | | B | | | |
| 5 | C | | | | D | | | |
| 6,7 | ............ | | | | | | | |
| 8 | 0 | 0 | 0 | 0 | 0 | 0 | 0 | Power_present |
| 9 | Connecting position  A Sink takes "00".  A device read this value, increment by 1 and get as own value. | | | Power Type  00; No power  01; Original power  10; Relay power  11; Reserved | | Current  0000; No power supply  0001; 25mA (Standby power)  0010; 150mA    0011; 275mA  0100; 400mA    0101; 525mA  0110; Depend on Sink  0111-1111; Reserved | | |

FIG.15

| Name | Range Description | | Length | Purpose |
|---|---|---|---|---|
| [Power_Cable] | [Physical Address] [Connecting position] [Wire] [Power2] [Sink_Current] [Source_Current] [Cable_Current] [Check_sum] | | 2 bytes | |
| [Physical Address] | Source Physical Address | | 2 bytes | Source Physical address which a cable connects. |
| [Connecting position] | Connecting position | | 2 bits | A Sink takes "00". Increment the value that it reads from EDID. |
| [Wire] | "Connect" | 0 | 1 bit | Utility line is connected between the connecters. |
| | "No Connect" | 1 | | Utility line is not connected between the connecters. |
| [Power2] | "None" | 0 | 1 bit | A Source is allowed to consume no additional power except a Sink. |
| | "Independent" | 1 | | A Source is allowed to consume additional power other than a Sink. |
| [Sink_Current] | | | 3 bits | Maximum current that a Sink provides. |
| [Source_Current] | | | 3 bits | Maximum current that a Source is allowable to consume. |
| [Cable_Current] | | | 3 bits | Maximum current that a Connecting position 1 is allowable to consume. |
| [Cable_Current] | | | 3 bits | Maximum current that a Connecting position 2 is allowable to consume. |
| [Cable_Current] | | | 3 bits | Maximum current that a Connecting position 3 is allowable to consume. |
| Reserved | | | 3 bits | Set to "000" |
| [Check_sum] | | | 2 bits | |

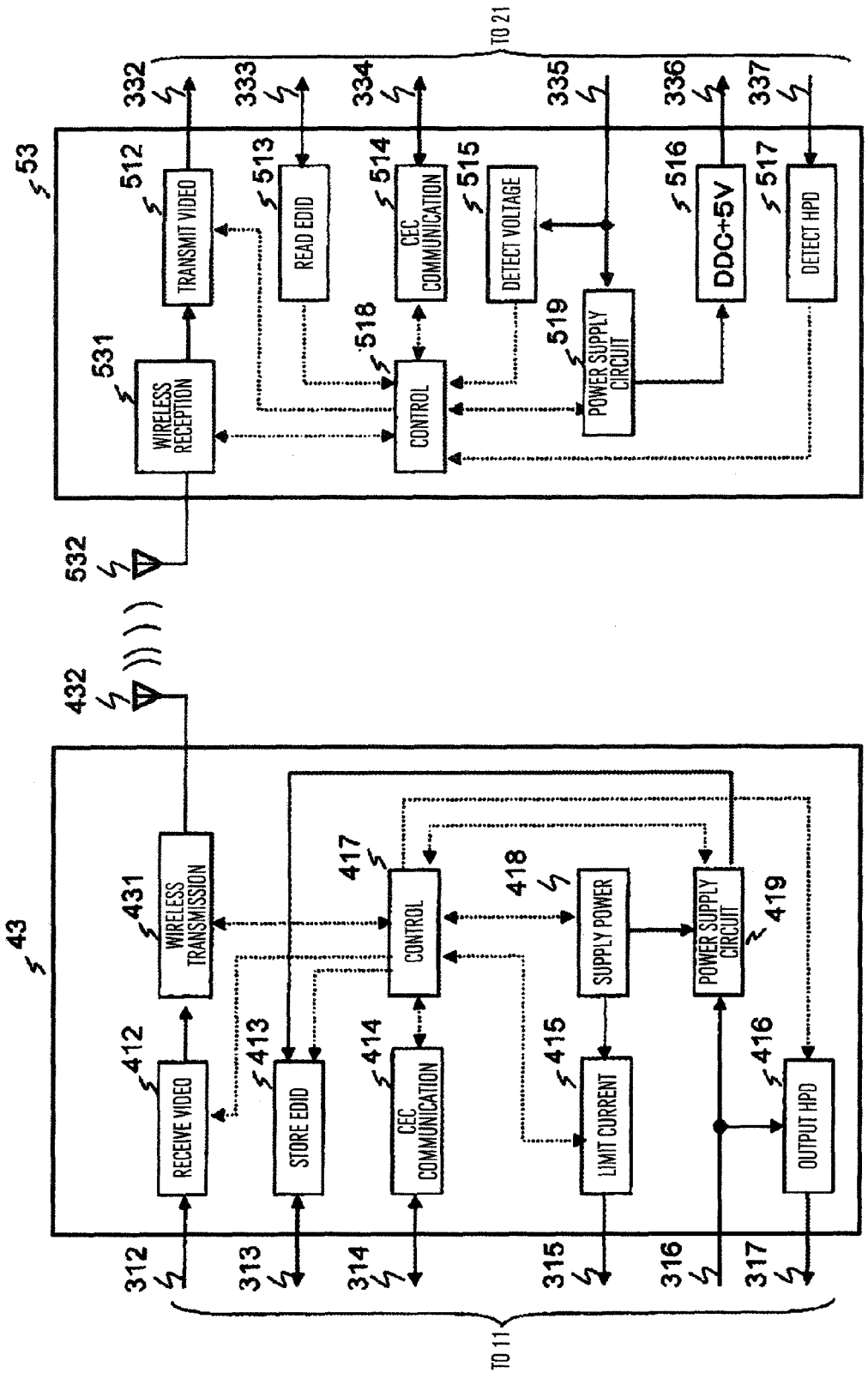

FIG.17

| Name | Range Description | | Length | Purpose |
|---|---|---|---|---|
| [Power_Source] | "No need" | 0 | 1 bit | A Source does not need power from a Sink. |
| | "Need" | 1 | | A Source requires power from a Sink or a Cable. |
| | Reserved | | 7 bits | Set to "0000000" |
| [Power_Sink] | [Input Port Number] [Supply_Power] | | 1 byte | |
| [Input Port Numver] | Sink's Input Port Number | | 4 bits | Specify a Sink's input port number. Same as the last number except 0 in the connected Source Physical Address. |
| [Supply_Power] | "No Power" | 00 | 2 bits | A Sink supplies no Power. |
| | "Power for Source" | 01 | | A Source is allowed to consume power form a Sink. |
| | "Power for Cable" | 10 | | A Cable is allowed to consume power. from a Sink. |
| | "Both" | 11 | | A Source and Cable is allowed to consume half power each, from a Sink. |
| Reserved | | | 2 bits | |
| [Power_Cable] | [Connecting position] [Wire] [C_Power] | | 1 byte | |
| [Connecting position] | Connecting position | | 2 bits | A Sink takes "00" and a Repeater increments the value that it reads from EDID. |
| [Wire] | "Connect" | 0 | 1 bit | Utility line is connected between the connecters. |
| | "No Connect" | 1 | | Utility line is not connected between the connecters. |
| [C_Power] | "None" | 000 | 3 bits | A Cable does not consume or supply power on Utility line. |
| | "Consume Full" | 001 | | A Cable is allowed to consume full power from a Sink. |
| | "Consume Half" | 010 | | A Cable is allowed to consume half power. from a Sink. |
| | "Consume & Supply" | 011 | | A Cable is allowed to consume full power from a Sink and supply another power to a Source. [Wire] shall be "No connect"... |
| | "Supply only" | 100 | | A Cable supply another power to a Source. [Wire] shall be "No connect" |
| Reserved | | | 2 bits | Set to "0" |

TRANSMISSION SYSTEM AND RELAY DEVICE

INCORPORATION BY REFERENCE

The present application claims priority from Japanese application JP2011-050971 filed on Mar. 9, 2011, the content of which is hereby incorporated by reference into this application.

BACKGROUND OF THE INVENTION

A technical field relates to operations of power supply and reception.

JP-A No. 2009-44706, the counterpart of U.S. Publication No. 2010/0135429, discloses "a transmission device which includes a signal transmitter for transmitting a video signal via a cable to a reception device in the form of a differential signal through a plurality of channels, an information transmitter for transmitting request information to request power supply via the cable to the reception device, and a power switch for supplying the power supplied via the cable from the reception device to an internal circuit in response to transmission of the request information from the information transmitter" (refer to JP-A No. 2009-44706, Paragraph [0017]).

JP-A No. 2009-44706 also discloses "a source device 110 which transmits request information of power supply to a sink device 120 using a CEC line of a HDMI cable 130" (refer to JP-A No. 2009-44706, Paragraph [0100]), and also discloses "a sink device 120A which supplies power to a source device 110A via a reserve line of the HDMI cable 130" (JP-A No. 2009-44706, Paragraph [0220]).

JP-A No. 2010-4510, the counterpart of U.S. Publication No. 2008/0315291, discloses "function information is transmitted as OEC (Consumer Electronics Control) data or CDC (Capability Discovery Channel) data from a source device to a sink device or from the sink device to the source device between the source and sink devices connected through an HDMI (High-Definition Multimedia Interface) via a CEC line as a control line" (refer to JP-A No. 2010-4510, Paragraph [0160]).

However, any of JP-A No. 2009-44706 and JP-A No. 2010-4510 fails to disclose power supply to a relay device (such as a cable or repeater device) connected between the sink and source devices.

SUMMARY OF THE INVENTION

In order to solve the above problem, such arrangements as set forth, for example, in claims are employed.

The present application includes a plurality of means for solving the above problem. As one of its examples, there is provided a system which transmits a video signal from a source device to a sink device via a relay device and in which the sink device supplies a power to the relay device on the basis of a request from the relay device.

As the employment of the above means enables power supply to the relay device installed between the sink and source devices, it improves user's convenience.

Other objects, features and advantages of the invention will become apparent from the following description of the embodiments of the invention taken in conjunction with the accompanying drawings.

BRIEF DESCRIPTION OF THE DRAWINGS

FIG. 1 shows a block diagram showing an example of a transmission system.

FIG. 2 shows an example of a message structure in the transmission system.

FIG. 3 shows a table showing an example of messages in the transmission system.

FIG. 4 shows a table showing an example of message parameters in the transmission system.

FIG. 8 shows a table showing an example of message parameters in the transmission system.

FIG. 9 shows a table showing an example of message parameters in the transmission system.

FIG. 10 shows a table showing an example of message parameters in the transmission system.

FIG. 14 shows a table showing an example of device information description.

FIG. 15 shows a table showing an example of message parameters in the transmission system.

FIG. 16 shows a block diagram for explaining an example of wireless transmission.

FIG. 17 shows a table showing an example of message parameters in the transmission system.

DESCRIPTION OF THE EMBODIMENTS

Figure 5:
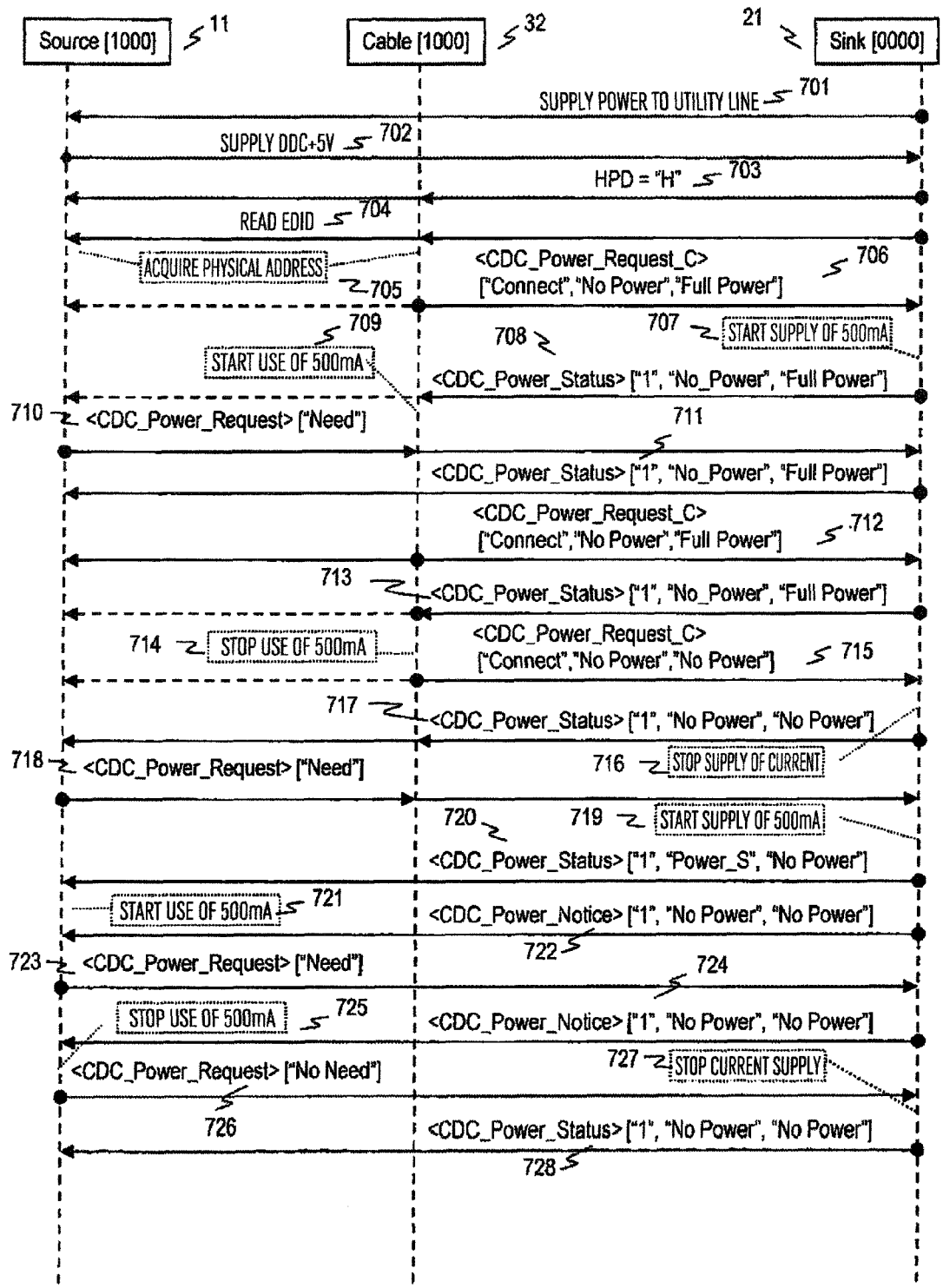
FIG. 5 shows an example of message transmission and reception in the transmission system.

Embodiments of the present invention will be explained.

Embodiment 1

FIG. 1 is a block diagram showing an example of a transmission system of this embodiment, in which a source device 11 is connected to a sink device 21 via a cable 32, a power is supplied from the sink device to the source device, and a video signal is transmitted from the source device to the sink device.

The source device 11 is a video signal transmitting device such as a disk player, a disk recorder, a semiconductor recorder, a broadcasting receiver, a game machine, or a personal computer (PC). The source device 11 has a reproducer 111 for reproducing a video signal from data obtained from a storage medium such as an optical disk, a magnetic recording disk or a semiconductor memory or from a network; a video transmitter 112; an EDID (Extended Display Identification Data) reader 113; a CEC (Consumer Electronics Control) communication unit 114; a voltage detector 115; a DDC (Display Data Channel) +5V supplier 116; an HPD (Hot Plug Detect) detector 117; a controller 118; and a power supply circuit 119.

The sink device 21 is a video signal reception device which includes such a display device as a liquid crystal display, a plasma display, an organic EL display. The sink device 21 further includes a display 211, a video receiver 212, an EDID memory 213, a CEC communication unit 214, a current limiter 215, an HPD output 216, a controller 217, a power supplier 218, and a power supply circuit 219. In this connection, the sink device 21 may have such an arrangement as to include a tuner, a descrambler, a demultiplexer, a decoder or a video recording function for processing broadcast waves received at an antenna, and as to be capable of reproducing video contents only with the sink device alone.

The cable 32 is a cable for connecting between connectors 312 to 317 of the source device and connectors 332 to 337 of the sink device, and is, for example, an HDMI converter cable. The cable 32 has an electrical to optical converter 321, a optical to electrical converter 322, an optical fiber 327, an EDID acquirer 323, a CEC communication unit 324, a controller 325, and a power supply circuit 326.

An example of the structure of a message for exchange among the CEC communication unit 114, the CEC communication unit 214, and CEC communication unit 324 is shown in FIG. 2. As shown in Patent Document 2, a CDC message is defines as one of CEC messages, which includes start bit showing the header of the message, followed by CEC header block having logical and physical addresses of transmission and reception devices of the message, CEC opcode block indicative of being CDC message, initiator physical address indicative of physical address of the message transmission device, CDC opcode indicative of type of the CDC message, and CDC parameter indicative of a parameter of the CDC message.

Explanation will be made in connection with the CDC message as an example. However, the present invention is not limited to the structure of the CDC message. When the CDC opcode is defined for the CEC opcode, the CEC message may be uses in place of the CDC message. Further, a bidirectional communication message of the DDC (Display Data Channel) or HDMI Ethernet channel for use in EDID reading may be also employed.

In the HDMI® system, a source device having an output terminal, a sink device having an input terminal, and a repeater device having output and input terminals have different physical addresses in principle, but a cable usually has no physical address. Several description manners of the initiator physical address are considered for the CDC message issued from a cable acquiring no physical address.

For example, the physical address of a source device shown in the EDID of a sink device is considered to be written in the initiator physical address of the CDC message transmitted from a cable. For another example, "FFFF" may be allocated to the initiator physical address, and information corresponding to the physical address of the source device may be described in the parameter of the CDC message.

The latter has a merit that, since the parameter of the CDC message becomes long with a result of a good communication time but the cable uses a physical address different from the source device, a risk of erroneous operation of the source device becomes small. In the following description of the embodiment, the former will be employed.

FIG. 3 is a table showing an example of a CDC message. In the table, <CDC_Power_Request> is a message for the source device to require such current supply as shown by a parameter [Power_Source] to the sink device (and/or the cable).

<CDC Power_Status> is a message for the sink device to inform the source device (and/or the cable) of start of such current supply as shown by a parameter [Power_Sink]. <CDC_Power_Notice> is a message for the sink device to previously notify the source device (and/or the cable) of a change in such supply current as shown by a parameter [Power_Sink].

<CDC_Power_Request_C> is a message for the cable to require such a current supply as shown by a parameter [Power_Cable] to the sink device. <CDC_Power_Notice_C> is a message for the cable to previously notify power stoppage to the source device during power supply from a unique power source other than the power supply from the sink device to the source device.

FIG. 3 shows responses to the respective messages if destination devices support the functions of the present invention.

In FIG. 3, further, when different message names (that is, different opcodes) for requesting power supply are used for the source device and the cable, one of the messages which is issued from one of the source device and cable can be distinguished from the other, even if a common physical address is used in the initiator physical address for the source device and the cable. This may be defined in such a manner that the message name is commonly used to the source device and the cable and different device types are added in their parameters to be distinguishable between the source device and the cable.

A distinction between the source device and the cable may also be made in such a manner that the number of parameters is changed, for example, the request current of a source device is described for the source device, and the request current of the cable a current capable of being supplied to the source device are described for the cable.

FIG. 4 is a table showing an example of message parameters. [Power_Source] indicates need or no need of power supply by 1 bit. [Power_Sink] is made of [Input Port Number] of 4 bits corresponding to numbers of input terminals for power supply, [P_Source] of 2 bits indicative of the status of power supply to the source device, and [P_Cable] of 2 bits indicative of the status of power supply to the cable.

[Input Port Number] is expressed by 4 bits corresponding to the input terminal numbers of the sink device, which indicate the physical address of a source device as a connection destination when combined with the initiator physical address in the CDC message. The input terminal number may be replaced with the physical address (that is, the physical address written in the EDID of the corresponding input terminal) of 2 bytes of the connection destination. In order to suppress the message length and shorten a communication time, however, the use of the input terminal number of 4 bits is desirable.

[P_Source] includes "No Power" indicative of no power supply to the source device, "Half Power" indicative of supply of half of a predetermined power, "Power_S" indicative of supply of the predetermined power from the sink device, and "Power_C" indicative of supply of the predetermined power from a power source provided in the cable independently of the sink device. [P_Cable] includes "No Power" indicative of no power supply from the sink device to the cable, "Half Power" indicative of supply of half of the predetermined power, and "Full Power" indicative of supply of the predetermined power.

[Power_Cable] is made up of [Wire] of 3 bits indicative of whether or not utility terminals at both ends of the cable are connected so that the power can be supplied, [P_Source] of 2 bits indicative of the status of power supply to the source device, and [P_Cable] of 2 bits indicative of the status of power supply to the cable. [Wire] indicates a connection status "Connect" and a no connection status "No Connect". [P_Source] and [P_Cable] have the same meanings as in the aforementioned parameter [P_Source] and thus explanation thereof is omitted herein.

In FIG. 4, such a status that the power from the sink device is divided into halves by the source device and the cable, is defined. For simplicity of the explanation, however, it is obvious that such a status may be removed and such an exclusive control may be provided that, when one of the source and sink devices receives the power, the other device cannot receive it.

FIG. 5 shows an example of message transmission and reception. Explanation will be made as to the operation of a transmission system by referring to FIGS. 1 to 5.

First of all, a power, e.g., 5V, 65 mA for booting the transmission system is supplied from the power supplier 218 of the sink device 21 to the power supply circuit 119 of the source device 11 via the current limiter 215, a utility terminal 335, the cable 32 and a utility terminal 315 (step 701).

The power supply circuit 119 of the source device 11 supplies a power to the HPD output 216 and the power supply circuit 219 of the sink device 21 through a DDC+5V supplier 116, a DDC+5V terminal 316, the cable 32 and a DDC+5V terminal 336 (step 702).

The HPD output 216, when receiving the power, sends a logical level indicative of completion of cable connection, e.g., "H" to the HPD detector 117 of the source device 11 through the HPD terminal 337, the cable 32 and the HPD terminal 317 (step 703).

Cable connection information detected by the HPD detector 117 is informed to the controller 118, which in turn instructs the EDID reader 113 to read out the EDID. The EDID reader 113 reads out the EDID having information about the reception capability of the sink device written therein from the EDID memory of the sink device 21, acquires the information, and then informs the controller 118 of the information (step 704).

At this time, the EDID acquirer 323 of the cable 32 monitors a signal on the cable, and acquires information required at least by the cable 32 in the EDID acquired by the source device, for example, information or the like relating to the physical address of the source device expressed in a combination of the physical address of the source device and the input terminal number connected by the cable. In this way, the source device 11 and the cable 32 acquire the physical address of the source device from the EDID (step 705).

The power supplied from the power supplier 218 is divided, for example, into maximum 5 mA (supplied from the HPD terminal 335) for the operation of a circuit block in the cable 32, maximum 5 mA for the operation of a circuit block in the source device 11, and 55 mA outputted from a DDC+5V terminal 316 to the cable 32 and also to the sink device 21 from the source device. A power, 5V, maximum 55 mA, supplied from the DDC+5V supplier 116 is defined according to DDC Standards, that is, the power supplied from the DDC+5V supplier 116 is used so that the source device returns 5 mA from the DDC+5V terminal 316 to the cable 32 and returns 50 mA to the sink device 21.

Thus, when the sink device 21 supplying the system booting power from the utility terminal 335 defines a consumption current from a DDC+5V terminal 336 as maximum 10 mA, and when lacking maximum 40 mA is interchanged within the power supply circuit 219; a current flowing through the cable can be reduced and thus a power loss can be advantageously suppressed. In this case, a power to be supplied from the utility terminal 335 of the sink device for booting the transmission system becomes a total of 25 mA, that is, maximum 5 mA for the source device, maximum 10 mA for the cable (5 mA from the utility terminal and 5 mA from the DDC+5V terminal), and maximum 10 mA (to be supplied from the DDC+5V terminal to the HPD output 216 and to the EDID memory 213) for the sink device.

A message <CDC_Power_Request_C>["Connect", "No Power", "Full Power"] 706 for requiring the sink device 21 to supply a necessary power necessary for the cable 32 sends from the CEC communication unit 324 of the cable 32 to the CEC communication unit 214 of the sink device 21. For simplicity of the subsequent explanation, "CEC communication unit" is omitted and description is made simply by "the message is sent from the cable 32 to the sink device 21". The message 706 can be received even at the source device 11. However, since there is no change in the power reception status of the source device 11, and in particular, since internal control operation or response is not required, the message 706 directed toward the source device is shown by a dashed-line arrow.

The power supplier 218 of the sink device 21 supplies, e.g., 5V, 500 mA to the power supply circuit 326 of the cable 32 via the utility terminal 335 (step 707). The sink device 21 informs the cable 32 of a message <CDC_Power_Status>["1", "No Power", "Full Power"] 708 to inform start of supply of a power to the cable 32, so that the power supply circuit 326 of the cable 32 starts to use 500 mA (step 709). In this case, it is assumed that the cable 32 is connected to an input terminal number 1 (not shown) of the sink device 21.

The power supply circuit 326 supplies a power to the electrical to opticalelectrical to optical converter 321 and also to the optical to electrical converter 322. With this, a video output of the reproducer 111 is output from the video transmitter 112 to a video terminal 312 in the form of an electric video signal, is converted by the electrical to opticalelectrical to optical converter 321 to an optical video signal, and then sent to the optical to electrical converter 322 by the optical fiber 327. The transmission of the optical signal through the optical fiber enables easy transmission of the optical signal by a distance longer than the transmission of an electric signal. The optical signal is converted by the optical to electrical converter 322 to an electric video signal, and then outputted to a video terminal 332. The video receiver 212 receives the output electric video signal and displays it on the display 211 in the form of a video.

When it is desired for the source device 11 to receive a power, the source device sends a message <CDC_Power_Request>["Need"] 710 to the sink device 21 and also to the cable 32. The sink device, which is supplying a power to the cable, returns a message 711 <CDC_Power_Status>["1", "No Power", "Full Power"] indicating that the sink device cannot supply a power to the source device 11, to the source device 11. At the same time, the source device informs the source device 11 and the sink device 21 of the fact that the cable 32 is using a power, with use of a message 712 <CDC_Power_Request_C>["Connect", "No Power", "Full Power"].

Since the message 712 is the same as a message by which the cable requests power supply, the message 712 to the sink device is overlapped with the message 711. However, the sink device returns a message <CDC_Power_Status>["1", "No Power", "Full Power"] 713 to the cable 32. In order to avoid the overlap of the messages 711 and 713, the message 711 can be omitted when the message 712 is first sent as a response message to the message 710. To this end, the response message to the message 710 may be set so that the sink device 21 issues the message later than the cable 32 by prolonging the bus idle monitor time of the sink device or by returning the message after a predetermined time, e.g., about 0.1 seconds.

At this time, the sink device 21 may respond to the message 711 with a message <CDC_Power_Notice>["1", "Half Power", "Half Power"] indicative of previous notification of a change in power distribution, and may respond to it with the message 712 for the cable 32 to request the continuous supply sustainment of full power.

In this way, it is desirable in principle that the power supplying side determine power distribution instruction and power distribution to the currently-power-receiving device be preferential. Further, when a device receiving a power to be used and the power becomes unnecessary, it is preferable in principle that the power supply be quickly returned to increase an opportunity of power supply to a necessary device.

When the cable 32 stops its power use as when the transmission of a video signal is completed (step 714), the cable 32 sends a message 715 <CDC_Power_Request_C>["Connect", "No Power", "Full Power"] indicative of power reception stoppage to the sink device. The sink device stops the power supply (step 716), and informs the source device 11 and the cable 32 of the fact with the message <CDC_Power_Status>["1", "No Power", "No Power"] 711.

Even when the source device 11 transmits no video signal, the source device, for example, when the source device is a mobile device, may need a power in order to charge a built-in secondary battery. The source device 11 transmits a message <CDC_Power_Request>["Need"] 718 to the cable 32 and to the sink device 21. When the cable 32 is connected to a utility line to supply a power and it is unnecessary for the cable 32 in turn to use the power continuously, a response is not necessary in particular. However, the cable may respond to it with a message <CDC_Power_Request_C>["Connect", "Power_S", "No Power"] (not shown).

The sink device 21 starts supply of a predetermined power, 5V, 500 mA (step 719), and informs the source device 11 of start of the power supply with a message 720 <CDC_Power_Status>["1", "Power_S", "No Power"], and the source device 11 starts use of the predetermined power (step 721).

When the sink device 21 uses another function using the utility line, for example, when the sink device uses transmission of a packet signal or a voice signal or when it is desired to stop the power supply through user's operation; the sink device informs the source device 11 of the fact with a message <CDC_Power_Notice>["1", "No Power", "No Power"] 722. The source device is put in its power use stopping operation. When a time for backup or the like becomes necessary in the power stopping operation, the source device transmits a message <CDC_Power_Request>["Need"] 723 to require the continuous power supply to the sink device 21.

When the sink device 21 continuously supplies the power, the sink device transmits a message (not shown) <CDC_Power_Status>["1", "Power_S," "No Power"] to the source device. When the sink device performs its power supply stopping operation, however, the sink device sends a message <CDC_Power_Notice>["1", "No Power", "No Power"] 724 to the source device 11 at time intervals of a predetermined time, e.g., 5 seconds. In case of emergency as when the main power switch of the sink device 21 is turned OFF or the like, the sink device 21 suddenly may stop its power supplying operation without issuing the message 724. Thus, such a situation has to be beforehand considered to the source device 11.

The source device 11, after stopping its power supply (step 725), transmits a message <CDC_Power_Request>["No Need"] to the sink device 21. The sink device, after stopping its power supplying operation (step 727), sends a message <CDC_Power_Status>["1", "No Power", "No Power"] indicative of stoppage of the power supply to the source device 11. In this connection, even in the case of the power supply stoppage, when it is intended for the sink device to reboot the transmission system, the sink device can continuously supply a power of about 5V, 65 mA or 25 mA as a booting standby power (step 701).

When the source device receives the power supply, an electric wire connecting between the utility terminal 335 and 315 may have high resistances, so that a voltage applied to the source device 11 becomes too low compared to an output voltage of the sink device 21, in some cable 32. For example, assume now that the electric wire has a resistance of 5 Ω and a supply current is 500 mA with respect to an output 5V of the sink device 21. Then it is considered that a voltage drop of 2.5V occurs and a voltage applied to the source device 11 becomes 2.5V.

As a result, the voltage drop may possibly cause erroneous operation of the source device or troubles including heat generation in the cable. To avoid this, the voltage detector 115 is required to be provided in the source device 11 so that, when the predetermined voltage is not higher than, e.g., 4V, the controller 118 receiving the detection result of the voltage detector 115 controls the power supply circuit 119 to suppress or stop the use power. In addition, when a current limiter having a margin value of about 10% of a predetermined maximum current supply is provided even in the sink device 21, a protection function is further enhanced.

In this way, the sink device supplies power not only to the source device but also to the cable requiring an external power. Then, long-distance transmission using optical fiber or the like becomes much easier to use because a special power source is not necessary Explanation has been made in connection with the cable as an example. However, some of HDMI® repeater devices copy an EDID shown by the sink device and transmit it to the source device, so that the physical address of the source device is overlapped with the physical address of the repeater device. Even such a repeater can receive power supply by using such a message for the active cable as mentioned above.

Embodiment 2

Figure 6:
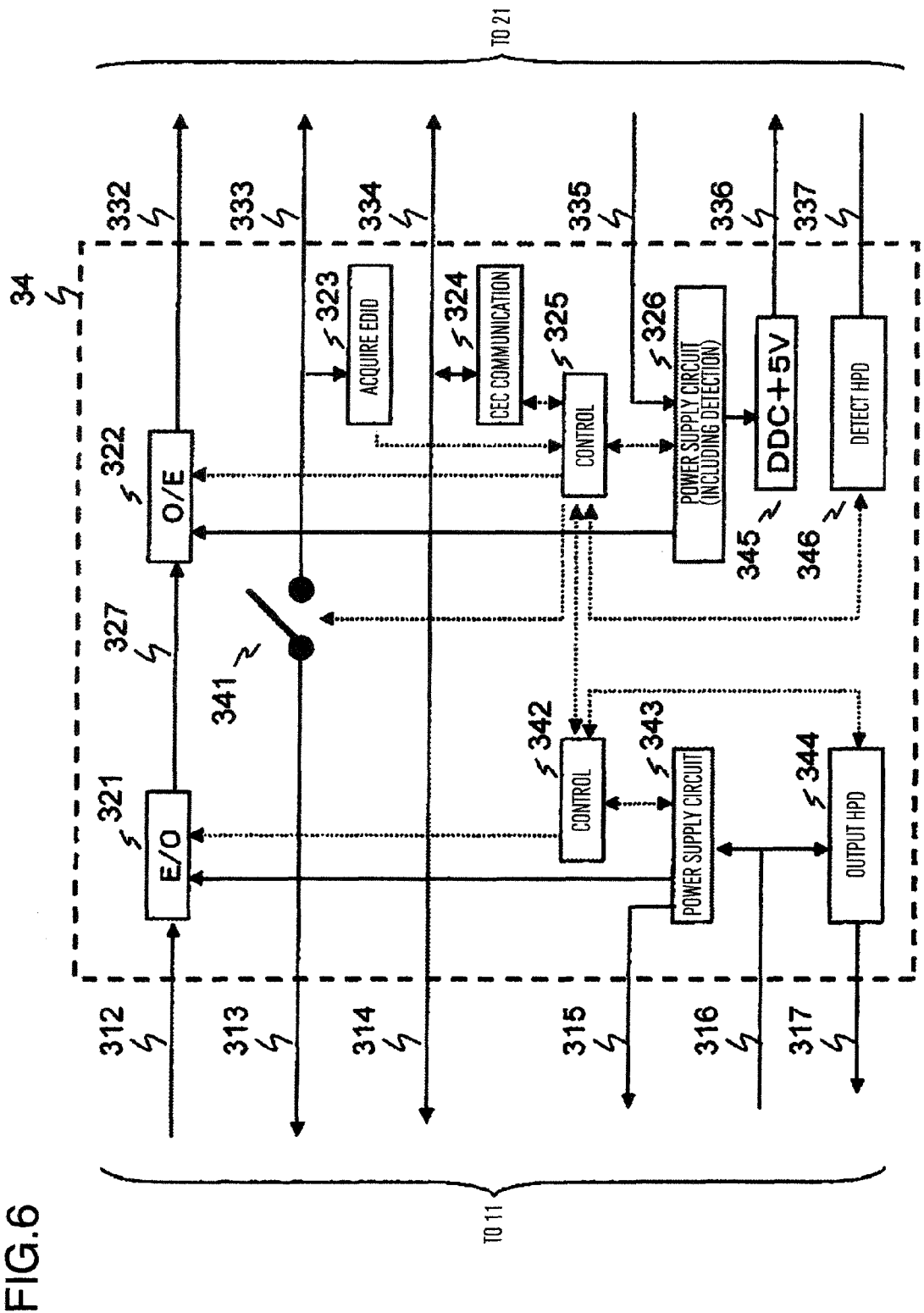
FIG. 6 shows a block diagram showing an example of a cable.
Figure 7:
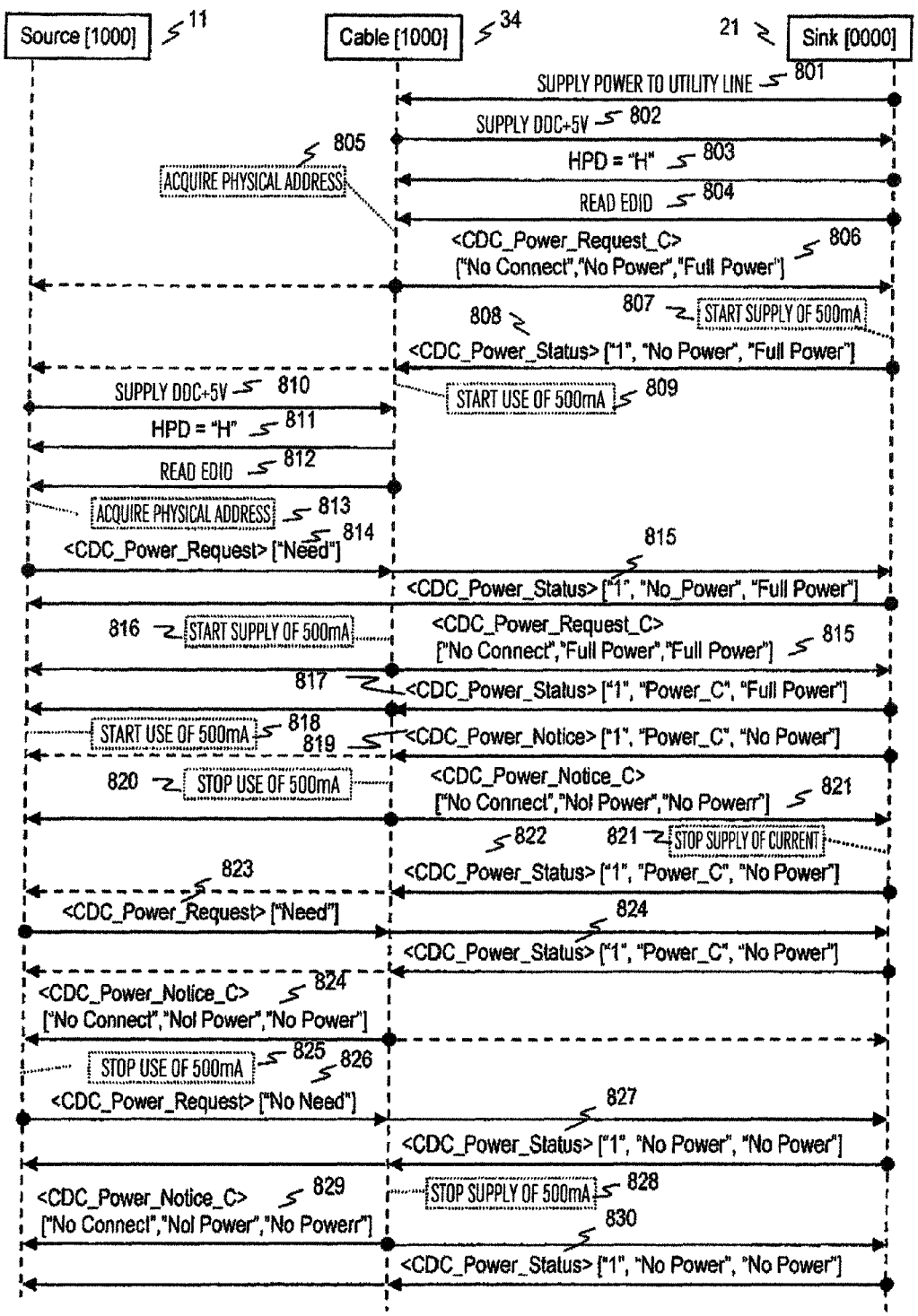
FIG. 7 shows an example of message transmission and reception in the transmission system.

Another embodiment of the transmission system in accordance with the present invention will be explained by referring to FIGS. 6 and 7. FIG. 6 is a block diagram of a part of a cable. A cable 34 is replaced by the cable 32 of FIG. 1, and includes a source device 11 and a sink device 21 both having similar structures to those in FIG. 1, and therefore the structures are not illustrated.

In FIG. 6, blocks having the same or equivalent functions are denoted by the same reference numerals. FIG. 6 is different from FIG. 1 in that a switch 341 is added between DDC terminals 313 and 333 for reading out EDID information; a utility terminal 315 is separated from a utility terminal 335, power supply circuits 343 and 326 are provided to the respective separated utility terminals; a DDC+5V terminal 316 is separated from the DDC+5V terminal 336 and an DDC+5V terminal 317 is separated from an DDC+5V terminal 337, an HPD output 344, an HPD detector 346, and a DDC+5V supplier 345 are added to the separated DDC+5V and HPD terminals.

A message structure, a message type, and message parameters in the embodiment 2 are the same as message structure (FIG. 2), message type (FIG. 3), and message parameters (FIG. 4) in the embodiment 1. FIG. 7 shows an example of message transmission and reception.

The sink device 21 supplies a power of, e.g., +5V, maximum 25 mA as a standby power to the power supply circuit 326 of the cable 34 via the utility terminal 335 (step 801). The power supply circuit 326 of the cable 34 supplies a power of +5V to the sink device 21 via the DDC+5V supplier 345 (step 802). The sink device 21 changes the level of the DDC+5V terminal 337 from "L" to "H" (step 803).

The HPD detector 346 of the cable 34 detects the level change and informs the controller 325 of the level change. After the controller 325 turns OFF the switch 341, the EDID acquirer 323 reads out the physical address of the source device included in the EDID information of the sink device 21 and acquires the read-out physical address (steps 804 and 805).

In the embodiment 1, when the source device reads out the EDID of the sink device, the EDID acquirer intercepts the read-out signal. In the present embodiment, however, since the source device boots the transmission system prior to start of EDID reading operation, the EDID acquirer of the cable 34 is set to be able to singly read out the EDID information. At this time, in order to prevent of erroneous operation of the EDID reader of the source device, the switch 341 is provided.

Accordingly, the switch 341 is set at its OFF state in a time period during which the source device 11 does not read out the EDID and the cable 34 singly performs its EDID reading operation. In a time duration other than the EDID reading operation period of the cable 34 alone, the switch 341 is put in its connected state. When the cable length is long, provision of a buffer between the DDC terminals 313 and 333 enables increased reliability of DDC communication.

The cable 34, after acquiring the physical address, sends a message <CDC_Power_Request_C>["No Connect", "No Power", "Full Power"] 806 requiring power supply to the sink device 21. The sink device 21 starts supply of a power of, e.g., +5V, maximum 500 mA from the utility terminal 335 to the power supply circuit 326 of the cable 34 (step 807). The sink device sends a message <CDC_Power_Status>["1", "No Power", "Full Power"] to the cable 34 to inform the cable of start of the power supply. The cable 34 starts use of the power of +5V, maximum 500 mA (step 809) to put the optical to electrical converter 322 in its signal reception preparing operation.

The source device 11 is activated and supplies a power of, e.g., 5V, maximum 55 mA to the DDC+5V terminal 316 (step 810). The power supply circuit 343 supplies its power to the electrical to optical converter 321, and the HPD output 344 changes the level of the DDC+5V terminal 317 from "L" to "H" only while the HPD detector 346 detects the fact that the DDC+5V terminal 337 is at "H" level (step 811).

Since the EDID information cannot be read out from the EDID memory of the sink device 21 during "L" level of the HPD terminal 337, the HPD terminal 317 is kept at the "L" level. When the HPD terminal is changed to the "H" level, the source device 11 reads out the EDID information of the sink device 21 through the DDC terminal 312 and 333 (steps 812, 813). At this time, the EDID acquirer 323 of the cable 34 intercepts the EDID information, confirms information associated with the physical address of the source device 11, and if there is a change therein, then acquires the changed information. On the basis of the latest information, message transmission and reception are carried out.

When the source device 11 sends a message <CDC_Power_Request>["Need"] 814 to request power supply, the sink device 21, which is already supplying power to the cable 34 and has no allowance for the power supply, responds to it with a message <CDC_Power_Status>["1", "No Power", "Full Power"] 815 to disable the power supply.

Not only when the source device has no allowance for the power supply but also when no connection of the utility line is already known from the message 806, the sink device responds to it with the same message 815 indicative of the disabled power supply. When no connection of the utility line is not known and when no power is supplied to the cable, the sink device responds to it with a message <CDC_Power_Status>["1", "Power_S", "No Power"] (not shown) at the same time as the start of the power supply.

When the cable 34 when receiving the message 814, receives power supply at the power supply circuit 343 from a not shown power source; starts power supply to the source device 11 (step 816), and also informs the source device 11 and the sink device 21 of the fact, with the message <CDC_Power_Request_C>["No Connect", "Full Power", "Full Power"] 815.

The sink device 21 issues a message <CDC_Power_Status>["1", "Power_C", "Full Power"] 817 to confirm the power supply status, and the source device starts use of a power of +5V, maximum 500 mA (step 818). If the power supply status is different, then the source device 11 or the cable 34 issues a power request message for its medication.

When it is desired for the sink device 21 to stop the power supply through user's operation of the sink device 21 or the other means, the sink device issues a message <CDC_Power_Notice>["1", "Power_C", "No Power"] 819. The cable 34, when receiving a power supply stop request, accepts a power supply stoppage from the sink device 21, and issues a message <CDC_Power_Notice_C>["No Connection", "No Power", "No Power"] 821 to previously notify the source device 11 to the power supply stoppage.

The cable 34 responds to it with a message <CDC_Power_Request_C>["No Connect", "Power_C", "Full Power"] when the cable 34 does not accept the power supply stoppage from the sink device 21, and responds to it with a message <CDC_Power_Notice_C>["No Connect", "No Power", "Full Power"] when it is desired to firstly stop power supply to the source device.

The sink device 21 regards the cable 34 as having accepted the power supply stoppage and stops the power supply (step 821). At the same time, the sink device responds to it with a message <CDC_Power_Status>["1", "Power_C", "No Power"] 822.

When the source device 11 wants to request power supply continuation in response to the message 821, the cable issues a message <CDC_Power_Request>["Need"] 823 for the continuation request. A response message of the source device 11 to the same message 823 becomes the message <CDC_Power_Status>["1", "Power_C", "No Power"] 822.

When it is desired for the cable 34 to continuously stop the power supply to the source device 11, the cable issues a message <CDC_Power_Notice_C>["No Connection", "No Power", "No Power"] 824 at intervals of a predetermined time, e.g., about 5 seconds or more. When the source device 11 stops the use of a power, +5V, maximum 500 mA (step 825), the source device sends a message <CDC_Power_Request>["No Need"] 826 to the cable 34 and also to the sink device 21.

In response to it, the sink device 21, the sink device 21 issues a message <CDC_Power_Status>["1", "No Power", "No Power"] 827. The cable 34, on the other hand, stops supply of the power of +5V, maximum 500 mA, to the source device 11 (step 828), and responds to it with a message <CDC_Power_Request_C>["No Connect", "No Power", "No Power"] 829.

As a response to the message 829, the sink device 21 issues the message <CDC_Power_Status>["1", "No Power", "No Power"] 827 to confirm the current status. In this connection, when the cable 34 issues the message 829 before the sink device 21 issues the message 827, the message 827 may be omitted and it may be replaced with only a message 830. When the timing of issuing the message 827 is set to be later than the usual response, for example, by about 0.1 seconds, the possibility of omitting the message 827 can be increased and heavy traffic of the message communication channel can be avoided.

As has been mentioned above, since the power supply from the sink device to the cable and the power supply from a cable having an independent power source to the source device can be obtained, the system can be operated even when the cable has, at its sink device side, an insufficient power source and the source device has an insufficient power source, thus improving its the convenience of use.

Embodiment 3

A flexible embodiment capable of adjusting a current supply amount stepwise will be shown. In the present embodiment, a block diagram of a transmission system, a message structure and a message example are substantially the same as those in FIGS. 1, 2 and 3 explained in the embodiment 1, and explanation thereof is omitted.

In place of parameters in FIG. 4, message parameters defined in FIGS. 8, 9 and 10 are used. A maximum current use amount [Source Current] for a source device a maximum current use amount [Cable_Current] for a cable are prepared respectively to have 5 sorts of 125 mA units in a range of 0 and 500 mA and a type of 5 mA as a standby mode. A maximum current supply amount [Sink_Current] for a sink device are set to be stepwise incremented by 25 mA so that 25 mA can be incrementally added as a standby current.

In this case, "0 mA" in [Sink_Current] indicates that a current supply capability is smaller than 25 mA, and has no capability of supplying the standby power. In the present embodiment, the supply voltage is assumed to be +5V. However, any other voltage can be employed so long as the supply voltage is previously set. Further, similarly to the maximum current parameter, even voltage settings may be defined as combinations between arbitrary voltages and maximum currents by adding to parameters.

In the standby mode, 5 mA is assumed for the internal controller of each of the source device and the cable as a standby power source, a power in a range of (DDC+5V) to 10 mA is assumed as EDID reading for the sink device, and a preliminary current 5 mA prescribed in the DDC Standards (the source device supplies 55 mA and the sink device use maximum 50 mA) is added so that the sink device has a supply current of 25 mA.

In addition, check sum is provided for each message and a message having an incorrect check sum is ignored. Thus, when a predetermined response message cannot be obtained, the message is again transmitted. As a result, a transmission system having a high reliability can be obtained. A parameter [Power2] shown in FIG. 10 indicates that power supply is made from an independent power source having a cable section to a source device. Since the other parameters are substantially the same as those in FIG. 4, detailed explanation thereof is omitted.

Figure 11:
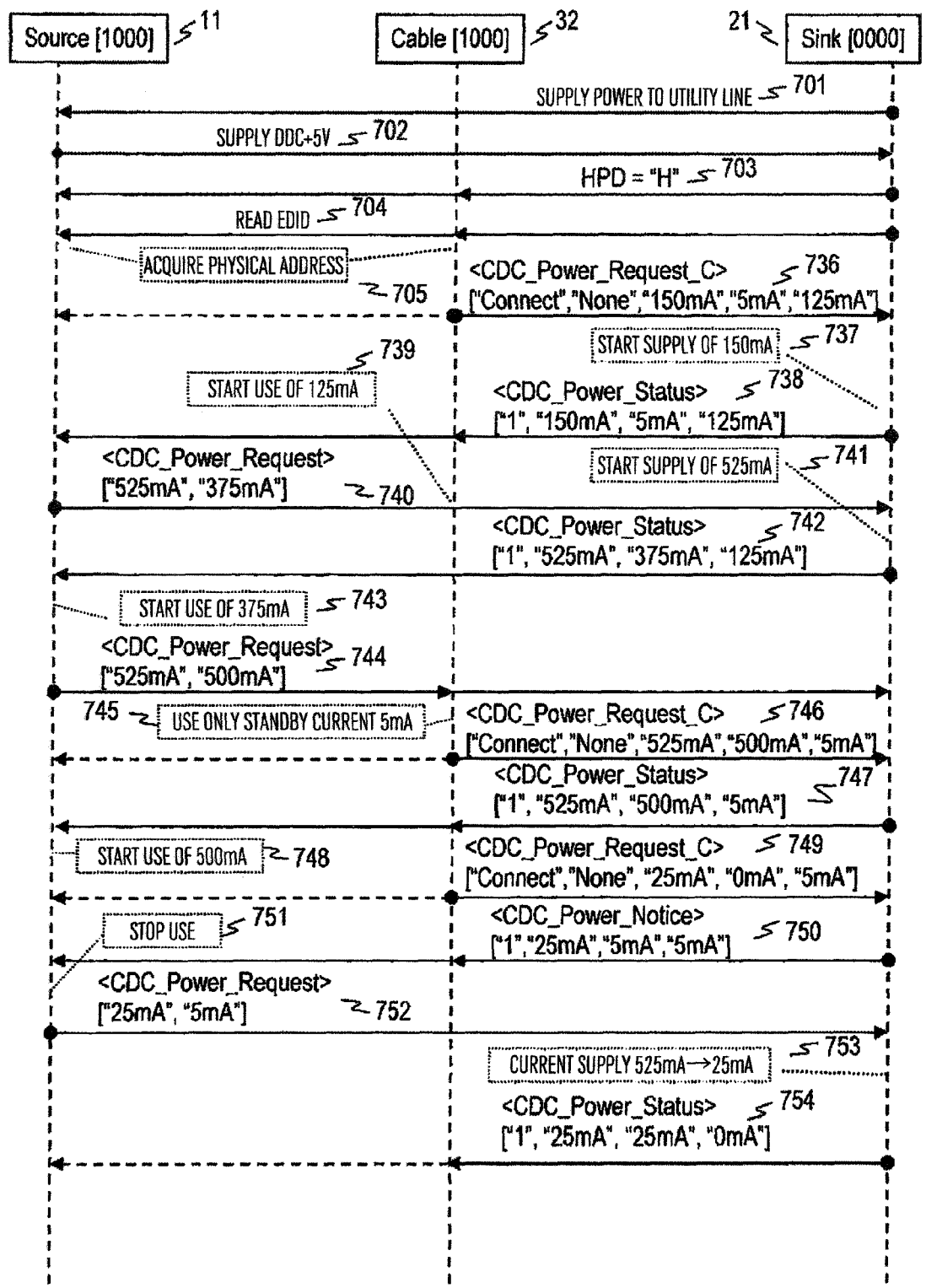
FIG. 11 shows an example of message transmission and reception in the transmission system.

FIG. 11 shows an example of message transmission and reception. The operation of the example will be explained by referring to FIG. 11. In the drawing, explanation of a parameter [Check_sum] is omitted. Steps until the source device 11 and the cable 32 acquire physical addresses are substantially the same as the steps of FIG. 5 already explained in the embodiment 1, and explanation thereof is omitted.

The cable 32 sends a message <CDC_Power_Request_C> ["Connect", "None", "150 mA", "5 mA", "125 mA"] 736 to the sink device 21 to request a power supply of 125 mA, and the sink device 21 starts supply of maximum 150 mA (step 737). The sink device informs the cable 32 and the source device 11 of the fact of the started supply of maximum 150 mA to the cable, with a message <CDC_Power_Status>["1", "150 mA", "5 mA", "125 mA"] 738. A supply start current to the sink device 21 is set to have any value so long as the supply start current is not lower than a requested value. For example, supply of a more current may be set so that the sink device issues a message <CDC_Power_Status>["1", "525 mA", "5 mA", "125 mA"] or a message <CDC_Power_Status>["1", "400 mA", "125 mA", "250 mA"]. The cable 32, when receiving the message 738, starts the use of a current of maximum 125 mA (step 740).

In the message 736, when a total of maximum currents to be consumed by the source device and the cable exceeds the maximum supply current of the sink device (except when the cable has its own power source) and when [Check sum] is incorrect; the sink device does not start the current supply, or starts supply of an amount of current appropriately estimated and sends a corresponding response message. Similarly, in the message 738, when a total of maximum currents to be consumed by the source device and the cable exceeds the maximum supply current of the sink device and when [Check sum] is incorrect; the cable 32 again transmits the message <CDC_Power_Request_C>["Connect", "None", "150 mA", "5 mA", "125 mA"] 736 to the sink device 21, thus increasing the reliability of the current supply of the transmission system.

The source device 11 next transmits a message <CDC_Power_Request>["525 mA", "375 mA"] 740 to the sink device 21 to request current supply of maximum 375 mA. The sink device 21 starts supply of a current not smaller than a total value, e.g., 525 mA of 125 mA of the cable and 375 mA of the source device (step 741), and notifies the source device 11 and the cable 32 of the fact, with a message <CDC_Power_Status>["1", "525 mA", "375 mA", "125 mA"] 742 to designate the maximum use current values of the source device and the cable. In response to the notification, the source device 11 starts use of the current of 375 mA (step 743).

For example, when the source device 11 stops video output and uses the current so far used for video transmission of the cable in order to speed up charging of a built-in optical battery; the source device sends a <CDC_Power_Request> ["500 mA", "500 mA"] message 744 to the cable 32 and the sink device 21 to request a current of 500 mA.

The cable 32 stops use of a current of 125 mA, uses only a standby current of 5 mA (step 745)), and sends a message <CDC_Power_Request_C>["Connect", "None", "525 mA", "500 mA", "5 mA"] 746 indicative of direction of 500 mA among the supply current of 525 mA of the sink device 21 to the source device 11, to the sink device 21.

The sink device 21 sends a message <CDC_Power_Status>["1", "525 mA", "500 mA", "5 mA"] 747 to the source device 11 to confirm the message 746 from the cable 32, and the source device 11 in turn, when receiving the message 747, starts use of the current of 500 mA (step 749).

When it is desirable for the cable 32 to stop the current supply to the source device 11, sends a message (not shown) <CDC_Power_Notice_C>["Connect", "None", "25 mA", "0 mA", "5 mA"] to the source device 11 or sends a message <CDC_Power_Request_C>["Connect", "None", "25 mA", "0 mA", "5 mA"] 749 to the sink device 21, and informs the source device 11 of the fact, with a message <CDC_Power_Notice>["1", "25 mA", "0 mA", "5 mA"] 750 as a response message to the sink device 21.

When it is desirable for the source device 11 to continue the current use, the source device 11 informs the sink device and the cable of the fact, with a message <CDC_Power_Request> ["525 mA", "500 mA"] (not shown). When it is desired for the source device 11 to stop the current use (step 751), the source device 11 informs the sink device 21 of the fact, with a message <CDC_Power_Request>["25 mA", "0 mA"] 752.

The sink device 21 reduces the supply current from 525 mA to 25 mA, and informs the source device 11 and the cable 32 of the fact, with a message <CDC_Power_Status>["1", "25 mA", "0 mA", "5 mA"] 754 indicative of the current status as a response message.

In accordance with the present embodiment, since a current supply amount of the sink device can be flexibly adjusted according to a current use amount of the source device or the cable, a power use efficiency of a power supply part or a power supply circuit in the sink device can be advantageously increased and the power consumption of the sink device can be advantageously reduced. Further, when interchange is made flexibly between the use currents of the source device and the cable, the full potential of the functions of the source device and the cable can be utilized.

Embodiment 4

Figure 12:
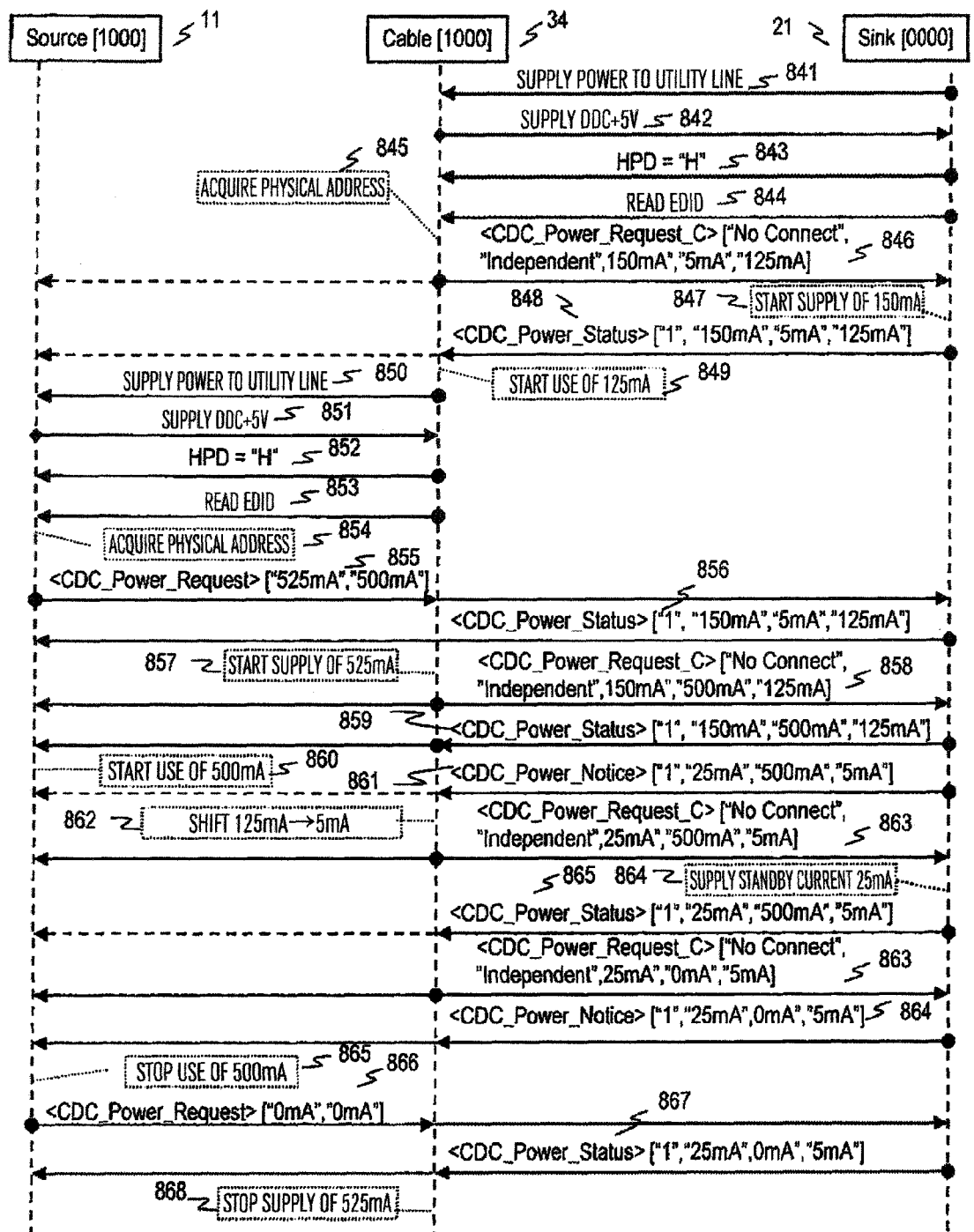
FIG. 12 shows an example of message transmission and reception in the transmission system.

FIG. 12 shows another example of the message transmission and reception when the cable 34 of FIG. 6 used in the explanation of the Embodiment 2 is combined with message parameters in FIGS. 8 to 10 used in the explanation of the Embodiment 3. Similarly to FIG. 11, description of the parameter [Check sum] is omitted. In FIG. 12, steps 841 to 853 until the source device 11 and the cable 34 acquire their physical addresses are substantially the same as those of FIG. 7 explained in the Embodiment 2, except that a step 850 of supplying a standby power of, e.g., +5V, 25 mA, to the utility terminal 315 from its own power source of the cable 34 is added.

Addition of the power supply step 850 enables the supply power of the cable 34 to the utility terminal can be used for the supply power of the source device 11 to the DDC+5V terminal 316.

When the source device requires a current of 500 mA, the source device sends a message <CDC_Power_Request> ["525 mA", "500 mA"] 855 to the cable 34 and to the sink device 21, without paying any consideration of a special situation as when the cable has its own power source therein or when the utility line is not connected. Since the sink device 21 acquires the fact of disconnection of the utility line of the cable 34 on the basis of a message 846, adjustment based on the message <CDC_Power_Notice>["1", "525 mA", "375 mA", "125 mA"] is difficult. Thus the sink device 21 responds to it with a message <CDC Power_Status>["1", "125 mA", "5 mA", "125 mA"] 856 indicative of the current distribution.

The cable 34 having its own power source, on the other hand, starts a current of 525 mA to the source device in response to the message 855 indicative of current request of the source device (step 857), and thereafter issues a message <CDC_Power_Request_C>["No Connect", "Independent", "150 mA", "500 mA", "125 mA"] 858 to the sink device to inform it of the fact. The sink device 21 in turn sends a message <CDC_Power_Status>["1", "150 mA", "500 mA", "125 mA"] 859 as a response message to confirm its status to the source device 11, and the source device 11 in turn starts use of a current of 500 mA (step 860).

When the sink device 21 became able to supply only the standby current through user's operation or the like, the sink device 21 informs the cable 34 of the fact, with a message <CDC_Power_Notice>["1", "25 mA", "500 mA", "5 mA"] 861. When it becomes unnecessary to the power continuation supply, the cable 34 informs the sink device of the fact, with a message <CDC_Power_Request_C>["No Connect, "Independent", "150 mA", "500 mA", "125 mA"] (not shown). However, when the current can be shifted to the standby current of 5 mA, after the shift (step 862), the cable sends a message <CDC_Power_Request_C>["No Connect", "Independent", "25 mA", "500 mA", "5 mA"] 863 to the sink device 21. The sink device 21 changes the current status to a status of supply of the standby current of 25 mA (step 864), and sends a message <CDC_Power_Status>["1", "25 mA", "500 mA", "5 mA"] 865 to confirm the current status.

When it is desirable for the cable 34 to stop the current supply to the source device 11 due to provision of its own power source, the cable sends the message <CDC_Power_Request_C>["No Connect", "Independent", "25 mA", "0 mA", "5 mA"] 8631 to the sink device 21. In response to a change request of the cable 34 to the supply current to the source device 11, the sink device sends a prior notice message <CDC_Power_Notice>["1", "25 mA", "0 mA", "5 mA"] 8641 to the source device 11.

The source device stops the current use of 500 mA (step 865), and returns a <CDC_Power_Request>["25 mA", "0 mA"] message 866. As its response, the sink device sends a <CDC_Power_Status>["1", "25 mA", "0 mA", "5 mA"] message 867 to confirm the status. The cable 34, after receiving the message 866 or 867, stops the current supply of 525 mA to the source device 11.

The present embodiment has a merit that the need for using a <CDC_Power_Notice C> message can be eliminated and thus the number of types of messages to be prepared can be reduced.

As has been explained above, in accordance with the present embodiment, even when the cable has its own power source, the supply current can be adjusted between the sink and source devices, thus enabling formation of a transmission system having a good handleability.

Embodiment 5

Figure 13:
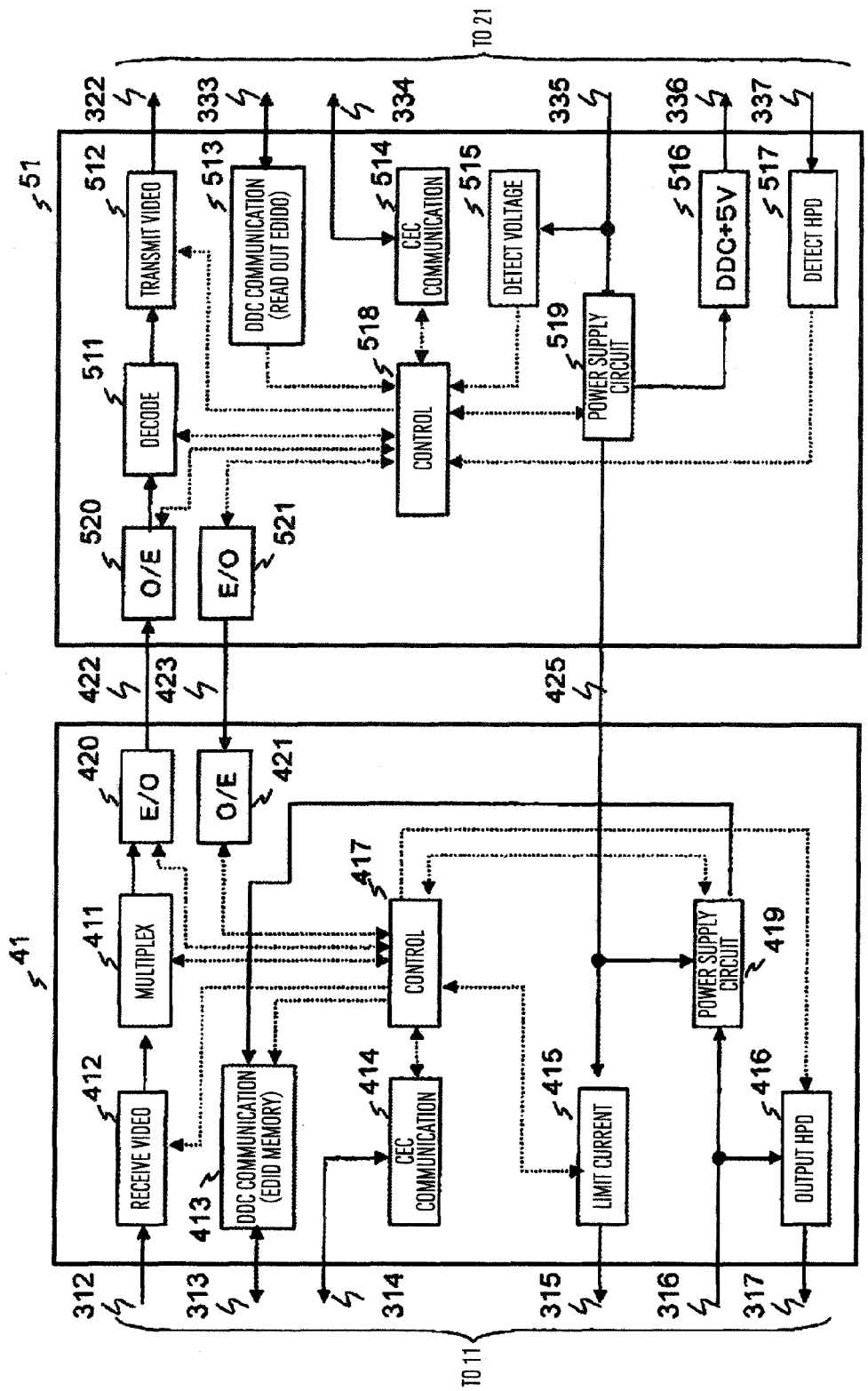
FIG. 13 shows a block diagram showing an example of a cable.

FIG. 13 shows a block diagram of a cable in another embodiment. In the drawing, an optical transmitter 41 is connected to an optical receiver 51 by a cable therebetween, the cable including optical fibers 422 and 423 and a bundle of electric wires 425. Connection between the optical transmitter 41 and a source device 11 and connection between the optical receiver 51 and a sink device 21 are made by simple cables. The "simple cable" means not such a cable 32 or 34 as to consume a current but such a cable that corresponding terminals at both end plugs are electrically connected to each other by electric lines. When the optical transmitter 41 has such its own power source as an AC adaptor or when the cable can be operated only with a power received from the source device, the electric wire bundle 425 can be removed.

The optical transmitter 41 includes a video receiver 412, a multiplexer 411, an electrical to optical converter 420, a optical to electrical converter 421, a DDC communication unit (including an EDID memory) 413, a CEC communication unit 414, a controller 417, a current limiter 415, a power supply circuit 419, and an HPD output 416.

The video receiver 412 receives a video signal received from the source device 11, the multiplexer 411 multiplexes the video signal with control information and so on received from the controller. The multiplexer may have a function of receiving 3 primary color signals of RCB in parallel and converting the signals in a single serial signal. An output signal of the multiplexer 411 is converted by the electrical to optical converter 420 to an optical signal and sent to the optical receiver 51 via the optical fiber 422.

The control information applied to the multiplexer 411 includes control operational information of the optical receiver 51, reception information of the CEC and DDC communication units 414 and 413. The optical to electrical converter 421 converts an optical signal transmitted from the optical receiver via the optical fiber 423 to an electric signal, transmits the electric signal to the controller 417 to be used at the CEC and DDC communication units 414 and 413 also as transmission information.

The optical receiver 51 includes a optical to electrical converter 520, a decoder 511, a video transmitter 512, an electrical to optical converter 521, a DDC communication unit (including an EDID reader) 513, a controller 518, an CEC communication unit 514, a voltage detector 515, a power supply circuit 519, a DDC+5V supplier 516, and an HPD detector 517.

The optical to electrical converter 520 converts a signal received from the optical transmitter 41 to an electric signal, and the decoder 511 decodes receives an output of the optical to electrical converter into the video signal and control information so far multiplexed. The video signal is sent from the video transmitter 512 to the sink device 21.

The control information is sent to the controller 518 to be used as transmission information of the CEC and DDC communication units 514 and 513. Control operational information within the optical transmitter 41 and reception information of the CEC and DDC communication units 514 and 513 are sent to the electrical to optical converter 521 via the controller 518. The electrical to optical converter 521 converts the received information to an optical signal and then sent into the optical fiber 423.

A major difference between FIG. 13 and FIG. 6 already explained in the Embodiments 2 and 4 is in that electric lines for DDC and CEC communication are replaced with an optical fiber for their communication and the cable bundle is simplified for easy long-distance transmission.

With respect to the DDC communication transmission in FIG. 13, the EDID information of the sink device 21 may be transferred when the source device 11 reads out the EDID information; or such EDID information of the sink device 21 that is read out by the DDC communication unit 513 of the optical receiver 51, is transmitted to the EDID memory 413 of the optical transmitter 41 and is stored in the EDID memory of the EDID memory 413, may be transmitted. When it is desired to transfer the EDID information of the sink device 21 as it is, the messages and parameters already explained in the Embodiments 1 to 4 may be used as they are.

FIG. 14 shows an example when the power supply capability of a device is described in the form of EDID. A physical address ABCD to be acquired by a source device as a connection destination is shown at the fourth and fifth bytes. An area or field where a power supply capability is written is newly added at the ninth byte, and the presence or absence of the area is shown at the eighth byte, fourth bit, by a 'Power present' flag.

When the flag is "1", description of the power supply capability is present. In principle, data other than the description of the power supply capability and than the flag indicative of the presence or absence of the same description area, are copied as they are from the EDID of the sink device and previously stored in the EDID memory of its own device. The power supply capability description include 'Connecting position' indicative of presence of anywhere between the sink device and the source device, 'Power Type' indicative of the type of the power supply, and 'Current' indicative of an amount of maximum supply current.

In the 'Connecting position' field, a sink device is expressed by "00". When 1 is added to a read numeral, its own device can have "01", "02", "03" in an order to be connected to the sink device. Thus, overlap between the physical addresses caused by the copying of the EDID and the unknown connection position can be avoided. When it is desired to inhibit the current consumption of the device reading "03" therein and to transmit the EDID to an upstream source device, erroneous operation can be prevented by describing "03" as it is without increasing its numeral.

The 'Power Type' field includes 'No power' indicative of incapable power supply, 'Original power' indicating when its own device has a power supply capability as when its own device has an AC adaptor, and 'Relay power' indicating when power of its own device supplied to a video output terminal and consumed is partly consumed at its own device and the remainder is supplied to another.

The 'Current' description field includes current values similarly to the parameters in FIG. 8, which depend upon the supply capability of the sink device for the 'Relay power' type device. The 'Current' can be changed on a real time basis. However, it is preferable that switching between power supply amounts be made in the form of message exchange using the bidirectional communication path of the CEC communication unit or the like.

FIG. 15 shows an example of message parameters assuming that a plurality of devices are connected in cascade between source and sink devices. Ones of the parameters added when compared with those in FIG. 10 will be explained. Assuming to use "FFFF" having an unknown meaning so as not to be overlapped with the physical address of the source device, in the Initiator Physical Address of the CDC message, the physical address of the source device corresponding to 2 bytes is described in the first part of parameters, together with 'Connecting position' data, and the connection position of its own device can be expressed to be specified.

Since the 'Connecting position' can be expressed by 3 locations shown by 1 to 3, the 'Cable Current' is prepared by 3 locations so that use currents of 3 devices can be described. Although merely 'Cable' is shown for convenience of explanation, the 'Cable' may include a repeater device.

How messages are transacted concretely is substantially the same as in the Embodiments 1 to 4, and explanation thereof is omitted.

As has been explained above, in accordance with the present embodiment, even when a plurality of cables or repeater devices are connected in cascade between source and sink devices, settings of transmission of EDID information and settings of message exchange current supply can advantageously made automatically.

Embodiment 6

FIG. 16 shows another embodiment. FIG. 16 is a block diagram of an example when a video signal is wirelessly transmitted from a source device 11 to a sink device 21 with use of a wireless transmitter 43 and a wireless receiver 53. FIG. 16 is different from FIG. 13 in that a wireless transmitter 431 and a wireless receiver 531 are provided in place of electrical to optical conversion, no utility line is provided for power transmission, and a power supplier 418 such as an AC adaptor is provided within the wireless transmitter 43. Messages, their parameters, operations, etc. are substantially the same as those in the Embodiment 5.

In this example, when a power transmitted from the source device 11 through the DDC+5V terminal can cover the power for the wireless transmitter, etc., the power supplier 418 becomes unnecessary. When transaction of messages similar to transaction of the messages for supplying currents form the sink device 21 is made by replacing the sink device 21 with the source device 11, an amount of current supplied from the source device 11 to the DDC+5V terminal 316 can be increased over 55 mA based on the DDC standards.

In this way, when the sink device 21 or the source device 11 supplies a power, such an AC adaptor, which has been necessary within the wireless receiver or transmitter 53 or 43, can be removed, thus advantageously improving its handleability.

Embodiment 7

FIG. 17 shows another embodiment. FIG. 17 is a table showing message parameters, corresponding to the table of FIG. 4 in the Embodiment 1. FIG. 17 is different from FIG. 4 in that power consumption/supply status of the source device and the cable are expressed in combination to avoid erroneous setting, and description of the cable connection position explained in the Embodiment 5 is added.

[Supply_Power] indicative of the power supply status of a sink device is expressed by "No Power" indicative no power supply, "Power for Source" indicative of power supply to the source device, "Power for Cable" indicative of power supply to the cable, and "Both" indicative of power supply each half to the source device and to the cable. Although settings are required while recognizing the power supply of the cable to the source device in FIG. 4, its operation becomes unnecessary and thus the operation of the sink device becomes light in the example of FIG. 17.

[C_Power] indicative of cable power consumption and supply is expressed by 5 status, that is, "None" indicative of no power consumption of the cable, "Consume Full" indicative of use of full or maximum power of the sink device, "Consume Half" indicative of use of half the power, "Consume & Supply" indicative of supply of the power from another AC adaptor to the source device while using the power from the sink device, and "Supply only" indicative of no use of the power from the sink device and supply of the power to the source device.

In the [Connecting Position] indicative of information on cable connection position, as shown in the Embodiment 5, memory data in the EDID is incremented by 1 for each connection.

In this method, all the cables are required to have a mechanism of incrementing the value by 1, which resulting in an increased circuit scale. To avoid this, a so-called cable having plugs at its both ends is set to only copy connection positional information at the time of EDID transmission to the next stage, and connection positional information about only a so-called repeater device having receptacles (receptacle connectors) at its both ends is incremented in units of 2. In the case of a special repeater device having a receptacle at one end and a plug at the other end, its connection information is incremented by 1.

When the connection positional information is describe in a message as positional information, with respect to the so-called cable, its connection positional information acquired from the EDID is incremented by 1, and the connection positional information of the so-called repeater device is incremented in units of 2, whereby the cable and repeater device can be distinguished from each other by [Connecting position] in the message.

An example of message exchange is substantially the same as in the Embodiment 1, and explanation thereof is omitted. In accordance with the present embodiment, less erroneous setting can be obtained and the transmission mechanism of the connection positional information can be simplified, to advantage.

In accordance with the respective embodiments, since not only power supply but also power supply of the sink device to a relay device such as a cable or a repeater device can be achieved, it becomes unnecessary to provide a power supply circuit such as an AC adaptor in the relay device, and a device having a good handleability can be provided.

Further, since a remainder power other than the consumed power of the relay device such as the cable or the repeater device or the power of its own power source provided in the relay device can be supplied to the source device, such a power supply circuit such as an AC adaptor of the source device can becomes unnecessary, and a device having a good handleability can be provided.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A transmission system for transmitting a video signal from a source device to a sink device via a relay device,
    wherein the sink device supplies a power to the relay device on the basis of a request from the relay device, and
    wherein each of the source device and the relay device has an acquirer for acquiring physical address information of the sink device provided from the sink device and an input terminal number thereof and a communication unit for transmitting or receiving messages to or from another device, a transmission message in the messages includes information about whether a transmission originator is the source device or the relay device, the transmission message of the relay device in the messages includes information about a power required by the relay device, the sink device starts supply of powers required by the source device and the relay device on the basis of the message received by the sink device and transmits a message including information about the power supply.

2. The transmission system according to claim 1, wherein one of the source device and the relay device which receives at least power supply has a voltage detector for detecting a reception power, and performs such control as not to increase or to decrease the reception power when a voltage detected by the voltage detector is not higher than a predetermined voltage.

3. The transmission system according to claim 1, wherein the sink device transmits a previous notice message to decrease an amount of supply power, keeps the power supply amount when receiving such a message as to request maintenance of the power supply amount from the source device or the relay device as a power supply destination, transmits the previous notice message at intervals of a predetermined time, and decreases the power supply amount even when receiving the request message after transmitting the previous notice message by a predetermined number of times.

4. The transmission system according to claim 1, wherein the sink device and/or the relay device has the communication unit for transmitting information about a connection position and information about a power supply capability to the relay device or to the source device, the connection positional information is information about sequential addition of a predetermined value to an initial value of the sink device in a connection order, and the relay device transmits a message including the positional information of the relay device.

* * * * *